United States Patent
Song

(10) Patent No.: US 11,115,227 B2
(45) Date of Patent: Sep. 7, 2021

(54) TERMINAL AND METHOD FOR BIDIRECTIONAL LIVE SHARING AND SMART MONITORING

(71) Applicant: AINEMO INC, Beijing (CN)

(72) Inventor: Chenfeng Song, Las Vegas, NV (US)

(73) Assignee: AINEMO INC., Beijing (CN)

( * ) Notice: Subject to any disclaimer, the term of this patent is extended or adjusted under 35 U.S.C. 154(b) by 727 days.

(21) Appl. No.: 15/321,488

(22) PCT Filed: Sep. 15, 2014

(86) PCT No.: PCT/CN2014/086573
§ 371 (c)(1),
(2) Date: Nov. 6, 2017

(87) PCT Pub. No.: WO2015/196583
PCT Pub. Date: Dec. 30, 2015

(65) Prior Publication Data
US 2020/0136846 A1    Apr. 30, 2020

(30) Foreign Application Priority Data
Jun. 26, 2014    (CN) .......................... 201410300311.X

(51) Int. Cl.
*H04L 12/18*    (2006.01)
*H04N 7/15*    (2006.01)
(Continued)

(52) U.S. Cl.
CPC ........... *H04L 12/1831* (2013.01); *G09G 5/10* (2013.01); *H04L 12/1822* (2013.01);
(Continued)

(58) Field of Classification Search
None
See application file for complete search history.

(56) References Cited

U.S. PATENT DOCUMENTS

2008/0068459 A1    3/2008 Wong et al.
2011/0213218 A1    9/2011 Weiner et al.
(Continued)

FOREIGN PATENT DOCUMENTS

CN    1852426 A    10/2006
CN    101146217 A    3/2008
(Continued)

OTHER PUBLICATIONS

First Office action issued in parallel Chinese Application No. 201410300311.X, dated Nov. 1, 2016.
(Continued)

*Primary Examiner* — Joshua Joo
(74) *Attorney, Agent, or Firm* — Jenkins, Wilson, Taylor & Hunt, PA

(57) ABSTRACT

Provided is a terminal and method for bidirectional live sharing and smart monitoring. In some embodiments, the terminal comprises: a video capture unit, an audio capture unit, a display, a speaker and a transceiver. The video capture unit captures video in real time and the audio capture unit captures audio in real time. The transceiver identifies whether a person or a specific person, a specific action, or an abnormal condition exists in the video and the audio respectively captured by the video capture unit and the audio capture unit, and transmits a first notification information when identifvina the person or the specific person, the specific action, or the abnormal condition from the video and audio.

18 Claims, 4 Drawing Sheets

(51) Int. Cl.
*G09G 5/10* (2006.01)
*H04M 3/56* (2006.01)
(52) U.S. Cl.
CPC ............ *H04M 3/567* (2013.01); *H04N 7/152* (2013.01); *G09G 2320/0626* (2013.01)

(56) References Cited

U.S. PATENT DOCUMENTS

| | | | | |
|---|---|---|---|---|
| 2013/0115927 | A1* | 5/2013 | Gruber | H04W 4/16 455/414.1 |
| 2014/0214726 | A1* | 7/2014 | Minato | G05B 15/02 705/400 |
| 2014/0229835 | A1* | 8/2014 | Ravine | H04L 65/60 715/720 |
| 2014/0376876 | A1* | 12/2014 | Bentley | G06K 9/00744 386/227 |
| 2015/0310712 | A1* | 10/2015 | Lyman | G08B 15/002 348/14.01 |
| 2016/0301649 | A1* | 10/2016 | Faaborg | H04L 67/26 |
| 2017/0186309 | A1* | 6/2017 | Sager | G08C 19/00 |
| 2019/0058846 | A1* | 2/2019 | Zhou | H04L 65/1069 |

FOREIGN PATENT DOCUMENTS

| | | | |
|---|---|---|---|
| CN | 100493183 | C | 5/2009 |
| CN | 101600081 | A | 12/2009 |
| CN | 101808226 | A | 8/2010 |
| CN | 104104910 | B | 4/2018 |
| WO | WO-2013024673 | A1 * | 2/2013 ............ H04W 4/38 |
| WO | WO 2015/196583 | A1 | 12/2015 |

OTHER PUBLICATIONS

English-language abstract of Chinese Patent Application No. CN 1852426 A.
English-language abstract of Chinese Patent Application No. CN 101600081 A.
English-language abstract of Chinese Patent Application No. CN 101804226 A.
International Search Report and Written Opinion for Application No. PCT/CN2014/086573 dated Mar. 6, 2015.
Chinese Office Action for Application No. CN201410300311 dated Jun. 15, 2017.
Chinese Office Action for Application No. 201410300311 dated Oct. 31, 2017.

* cited by examiner

TERMINAL AND METHOD FOR BIDIRECTIONAL LIVE SHARING AND SMART MONITORING

This application claims the benefit of a Chinese patent application No. 201410300311.X filed on Jun. 26, 2014, with the title "TERMINAL AND METHOD FOR BIDIRECTIONAL LIVE SHARING AND SMART MONITORING"; the entire content of which is incorporated herein by reference.

TECHNICAL FIELD

The present invention relates to communication technologies, and in specifically, to a terminal and method for bidirectional live sharing and smart monitoring.

BACKGROUND

Although existing video communication terminals can provide users with audio and video communication services through the Internet. However, on the one hand, every communication between video communication terminals of this kind needs to be established. Communication disconnects after video call ends. It is not suitable for scenes that require live sharing on some occasions. For example, family members who are not in a room need to be shared live at all times; do not want to call each time before you need to share. However, the existing video communication terminals usually only implement real-time video communication for a limited period of time. After the communication ends, both parties need to suspend the call and disconnect the communication connection. Before the next communication, you also need to establish communication connection with the other terminal again. On the other hand, the existing video communication terminals can only provide communication services and cannot provide monitoring and automatically notify each other of the functions. For example, when one family member is elderly and the elderly fail down at home, this event shall be automatic monitored and noticed other family members. In addition, for the existing terminal, the information sharing is only one-way, that is, one end can only share information with the other end, and cannot share information bidirectionally, and does not have functions of smart monitoring and notification.

SUMMARY

One of the technical problems to be solved by the present invention is to enable users to share lively at all times. Just as people who are not in one room feel at the same time in the same room and seem to have opened a window between different distant places, such as their own home and their parents' home.

Another technical problem to be solved by the present invention is to inform the other terminal real-time notification of some scenarios that may occur that one terminal needs attention on the other terminal.

According to an embodiment of an aspect of the present invention, there is provided a terminal for bi-directional live sharing and smart monitoring, comprising a video capture unit, an audio capture unit, a display, a speaker and a transceiver, wherein the transceiver transmits the video and the audio respectively captured by the video capture unit and the audio capture unit in real time to the specific address via the dedicated channel and receives the video and audio from the specific address in real time through the dedicated channel, then output respectively through the display and the speaker, in response to recognizing a person or a specific person, the specific action, or abnormal conditions from the video and audio respectively captured by the video capture unit and the audio capture unit, the transceiver sends notification information to the specific address in real time, wherein the dedicated channel is established in advance, each time the transceiver sending video and audio in real time to a specific address or receiving video and audio from a specific address, there is no need to re-establish the call, and the terminal is used for a trusted fixed place.

According to one embodiment of the present invention, the terminal for bi-directional live sharing and smart monitoring further comprising a recorder configured to start recording video and audio in response to identifying a person or a specific person, the specific action, or abnormal conditions from the collected video and audio the collected video and audio, and stops recording in response to a person or a specific person, or a specific action, or an abnormal condition disappears, the transceiver transmits the recorded content to the specific address when the recording is stopped.

According to one embodiment of the present invention, the terminal of the specific address is bound to a specific mobile terminal, wherein in response to identifying a person or a specific person, or a specific action, or an abnormal condition from the captured video and audio, the transceiver sends notification information to a specific mobile terminal bound to the terminal of the specific address, and/or send the video and audio captured by the video capture unit and the audio capture unit in real time to a specific mobile terminal bound to the terminal of the specific address.

According to one embodiment of the present invention, wherein the transceiver transmits the recorded content to the specific mobile terminal bound with the specific address in response to stopping the recording.

According to one embodiment of the present invention, the notification information includes at least one of the following:

information for requesting the terminal of the specific address enhances the display brightness of the video collected by the video capture unit information for requesting the terminal of the specific address enhances the brightness of the identified person or specific person or the specific action or abnormal condition;

information for requesting the terminal of the specific address superimposes a specific text or picture on the display;

information for requesting the terminal of the specific address outputs a specific sound;

information for requesting the terminal of the specific address automatically records the video and the audio including identified person or specific person or the specific action or abnormal condition respectively collected by the video capture unit and the audio capture unit sent by the transceiver.

According to one embodiment of the present invention, said transceiver receives notification information from said specific address regarding to the terminal of the specific address identified a person or a specific person or a specific action or an abnormal condition. In response to receiving the notification information, at least one of the following is performed: enhance the brightness of displayed video received by the display;

enhance the brightness of a person or a specific person or a specific action or an abnormal condition identified by the terminal at the specific address;

superimposing a specific text or picture on the display;
the speaker outputs a specific sound;
automatically records the video and the audio including identified person or specific person or the specific action or abnormal condition received by the transceiver in real-time.

According to one embodiment of the present invention, the transceiver sends a message to the specific address in response to the specific action being recognized as a departure from home.

According to one embodiment of the present invention, the transceiver transmits the message set by the specific person to the specific address in response to the specific action recognized being that a specific person leaves the home.

According to one embodiment of the present invention, the message set by the specific person is a text message and/or a voice message, wherein the text message is input by the specific person on an interface of the display, the voice message is recorded by the specific person through the audio capture unit.

According to one embodiment of the present invention, in response to the text message being received by the transceiver, the text message is displayed on the display and/or is output by the speaker by converting the text message into human voice.

According to one embodiment of the present invention, the text into which the voice memo is converted is displayed on the display in response to the voice memo being received by the transceiver, and/or output the voice memo by the speaker, and/or save the voice memo as an audio file in the terminal for later listening by the user, According to one embodiment of the present invention, the terminal of the specific address is bound to a specific mobile terminal, and in response to the specific action identified being that a specific person leaves home, the transceiver sends the text message and/or the voice message set by the specific person to the specific mobile terminal bound with the terminal of the specific address.

According to one embodiment of the present invention, the terminal is bound to a user's mobile terminal and in response to the transceiver receives the text and/or voice memo, recognizing a person or a specific person in the video and audio respectively collected from the video capture unit and the audio capture unit; in response to no person or a specific person is recognized from video or audio captured by the video capture unit or the audio capture unit, forwarding the received text and/or voice message to the user's mobile terminal bound to the terminal.

According to one embodiment of the present invention, the dedicated channel is an end-to-end dedicated channel.

According to one embodiment of the present invention, the specific address is a plurality of specific addresses.

According to one embodiment of the present invention, the dedicated channel is a set of dedicated channels formed by server transfer between the terminal and the plurality of specific addresses.

According to one embodiment of the present invention, the display simultaneously displays the video of the terminals from the plurality of specific addresses.

According to one embodiment of the present invention, in response to a video and/or corresponding identification of a terminal from one of the plurality of specific addresses is selected, the display does not display the video from the terminal of the specific addresses and/or the speaker does not output audio from the terminal of the specific addresses.

According to one embodiment of the present invention, in response to a video and/or a corresponding identification of a terminal from a specific one of the plurality of specific addresses being selected, the display displays the video from the one specific address in an enlarged main screen.

According to one embodiment of the present invention, the plurality of specific addresses has different priorities, and the display displays the video of the terminal from the specific address with the highest priority as the main screen.

According to one embodiment of the present invention, the priority is set for different ones of a plurality of specific addresses. In response to identifying a specific person from video and audio respectively collected by the video capture unit and the audio capture unit, the display displays the video from the terminal for the specific address with the highest priority of the specific person as the main screen.

According to one embodiment of the present invention, the plurality of specific addresses has different priorities. In response to identifying a specific person from the video and audio respectively captured by the video capture unit and the audio capture unit, the display becomes only displaying video from the terminal for the specific address with the highest priority for that specific person.

According to one embodiment of the present invention, the person or specific person is identified based on one or more of person identification, height identification, voice identification.

According to one embodiment of the present invention, the transceiver further receives and carries a wireless signal from the handset to identify a person or a specific person based on the identity of the hand-held handset as indicated in the wireless signal.

According to one embodiment of the present invention, the terminal for bi-directional live sharing and smart monitoring further comprising a depth sensor, the specific action is identified by basing on video and audio respectively captured by the video capture unit, the audio capture unit and the depth sensed by the depth sensors.

According to one embodiment of the present invention, the abnormal conditions are identified by identifying one or more of:
dramatic changes in the video captured by the video capture unit;
audio captured by the audio capture unit above a certain threshold;
a dramatic change in audio captured by the audio capture unit;
a predetermined event identified based on the video and audio respectively captured by the video capture unit and the audio capture unit, wherein a model of the predetermined event has been established in advance and a predetermined event is identified by searching for an event matched with an established model from video and audio respectively acquired based on the video capture unit and the audio capture unit.

According to one embodiment of the present invention, the terminal for bi-directional live sharing and smart monitoring further comprising: rotation means for rotating the video capture unit.

According to one embodiment of the present invention, in response to identifying one of the following elements in the video and audio respectively captured from the video capture unit and the audio capture unit, the rotating device rotates the video capture unit in the direction of the recognized element:
person or specific person;
specific action;
abnormal condition.

According to one embodiment of the present invention, the terminal for bi-directional live sharing and smart monitoring further comprising a light sensor for sensing ambient light changes around the terminal, wherein the display brightness of the display is adjusted according to the sensed change of the light.

According to an embodiment of another aspect of the present invention, there is also provided a method for bidirectional live sharing and smart monitoring comprising:

transmitting the collected video and audio to a specific address in real time through a dedicated channel and receiving the video and audio from the specific address in real time over the dedicated channel (S1);

in response to identifying a person or a specific person, or a specific action, or an abnormal condition from the collected video and audio, sending a notification information to the specific address in real time (S2);

the dedicated channel is established in advance, at each time sending video and audio in real time to a specific address or receiving video and audio from a specific address, there is no need to re-establish the call.

According to one embodiment of the present invention, the method further comprising: recording is start in response to recognizing a person or a specific person, or a specific action, or an abnormal condition from the collected video and audio, and is stop in response to a person or a specific person, or a specific action, or an abnormal condition disappears, after stop recording, sending the recorded content to the specific address.

According to one embodiment of the present invention, a terminal of the specific address is bound to a specific mobile terminal, and the method further comprises: in response to identifying a person or a specific person, or a specific action, or an abnormal condition from the captured video and audio, sending notification information to a specific mobile terminal bound to the terminal of the specific address, and/or sending the video and audio captured by the video capture unit and the audio capture unit in real time to a specific mobile terminal bound to the terminal of the specific address.

According to one embodiment of the present invention, transmitting the recorded content to the specific mobile terminal bound with the specific address in response to stopping the recording.

According to one embodiment of the present invention, the notification information includes at least one of:

information for requesting the terminal of the specific address enhances the display brightness of the collected video;

information for requesting the terminal of the specific address enhances the brightness of the identified person or specific person or the specific action or abnormal condition;

information for requesting the terminal of the specific address superimposes a specific text or picture on the display;

information for requesting the terminal of the specific address outputs a specific sound; information for requesting the terminal of the specific address automatically records the video and the audio including identified person or specific person or the specific action or abnormal condition sent to the specific address.

According to one embodiment of the present invention, the method for bi-directional live sharing and smart monitoring is further comprise of: receiving notification information from the specific address regarding the person or specific person identified by the terminal at the specific address, or a specific action, or an abnormal condition.

According to one embodiment of the present invention, the method for bi-directional live sharing and smart monitoring is further comprise of: in response to receiving the notification information, at least one of the following is performed:

enhance the brightness of displayed video;

enhance the brightness of a person or a specific person or a specific action or an abnormal condition identified by the terminal at the specific address;

superimposing a specific text or picture on the display;

outputs a specific sound;

automatically records the received video and the audio including identified person or specific person or the specific action or abnormal condition.

According to one embodiment of the present invention, sending a message to the specific address in response to the specific action being recognized as a departure from home.

According to one embodiment of the present invention, if the received notification is message, the message is displayed.

According to one embodiment of the present invention, transmitting the message set by the specific person to the specific address in response to the specific action recognized being that a specific person leaves the home.

According to one embodiment of the present invention, the message set by the specific person is a text message and/or a voice message, wherein the text message is input by the specific person on an interface of the display, the voice message is recorded by the specific person through an audio capture unit.

According to one embodiment of the present invention, in response to the text message being received, the text message is displayed and/or is output by converting the text message into human voice, According to one embodiment of the present invention, in response to receiving the voice memo, displaying the text into which the voice memo is converted, and/or outputting the voice memo, and/or saving the voice memo as an audio file for later listening.

According to one embodiment of the present invention, the terminal of the specific address is bound to a specific mobile terminal, and in response to the specific action being identified being a specific person leaving home, sending the text message and/or the voice message set by the specific person to the terminal of the specific address bound to specific mobile terminal.

According to one embodiment of the present invention, in response to receiving the text and/or voice memo, identifying a person or a specific person from the captured video and audio, in response to no person or a specific person is recognized from video or audio, forwarding the received text and/or voice message to the user's mobile terminal bound to the terminal.

Since the terminal for bi-directional live sharing and smart monitoring provided in one embodiment of the present invention can send audio and video information to a specific address in real time through a dedicated channel without having to re-establish a call with a specific address in the case that a dedicated channel has been established in advance, and truly implement the terminal-based audio and video information experience of the user. In addition, the terminal for bi-directional live sharing and smart monitoring provided by the present invention can also identify an object or a specific object based on the collected audio and video, sending notification messages to specific addresses in real time, therefore, users more easily and safely monitor the scene of the terminal that performs bi-directional live sharing and smart monitoring with high intelligence.

However, when the notification information is sent to a specific address, the user may not be located next to the terminal that performs bi-directional live sharing and smart monitoring, and cannot see the notification. Since the terminal for bidirectional live sharing and smart monitoring provided in one embodiment of the present invention records information including a person or a specific person or a specific action or an abnormal situation, the user can conveniently play back these important information afterwards. Moreover, the terminal for bidirectional live sharing and smart monitoring according to the present invention can also send the recorded content to the specific address in response to stopping the recording, so that the recorded whole process can be seen afterwards even if the user is not at home.

However, some incidents are more urgent, such as robbery at home, the user is assumed not at home, then reviewing the entire recording process thereafter is useless. Those situations must be dealt with in real time. The present invention enables notification by sending notification information to a specific mobile terminal bound to a terminal of the specific address in response to identifying a person or a specific person, or a specific action, or an abnormal situation from the collected video and audio. The beneficial effect of the present invention is that at some moments when an emergency response is required (such as robbery at home), the user can get a notification and handle an emergency even when no one is at home.

Although users are notified, they cannot be handled properly if they cannot see the scene of an incident such as a home-robbery. The beneficial effect of the present invention is achieved by identifying a person or a specific person, or a specific action, or an abnormal situation based on the video and audio captured. Transmitting video and audio captured in real time by the video capture unit and the audio capture unit to a specific mobile terminal bound to the terminal of the specific address. At some point in time that requires urgent handling, users can see what's happening in their room and react appropriately, even if they are not home.

In some cases, no on-site reactions are required, but evidence of the occurrence of the event needs to be obtained, and the user is not at home, at which point, by responding to a stop recording, the specific move bound to the specific address the terminal sends the recorded content, and achieves the beneficial effect of easily obtaining evidence of what is happening in the home even if the other is not at home. Since the terminal for bi-directional live sharing and smart monitoring provided by one embodiment of the present invention can send various forms of notification information including video notification, text notification, picture notification and voice notification to better notify the user Two-way live sharing and smart monitoring of the terminal identified by the scene, to improve a single notification method is not easy to cause the user's attention problems.

In addition, in some cases, there is no need for an on-site reaction, but evidence of the incident needs to be obtained. The user is not at home, but will soon return home. In this case, the beneficial effect of the present invention is that the terminal with a specific address can also be notified to record the information collected by the terminal performing bi-directional live sharing and smart monitoring. Although the user is not at home, when the user returns home, he will know the whole process of what happens.

Since the terminal for bi-directional live sharing and smart monitoring provided by one embodiment of the present invention may send a message to a specific address in response to a movement of a person away from home. It is possible to realize that persons near the terminals whose terminals are bi-directionally live-sharing and smartly monitored at one end and those at the other end that are bi-directionally live-sharing and smartly monitored are not on the terminals, and the former can still pass the latter what they want to say.

Since the terminal for bidirectional live sharing and smart monitoring provided in one embodiment of the present invention may also respond to the action of a specific person leaving home, send a message set by a specific person to a specific address, and may more specifically identify a specific People move away from home, so as to be more specific to a specific address to send a message tailored to specific people, to achieve personalized service, Moreover, the message including the text message and/or the voice message may achieve the beneficial effect of providing more flexibility for the user message. For example, the user does not operate the computer keyboard and can only speak and leave a message.

In addition, in some cases, the user of the terminal at the other end may be doing other things while he or she is in the room, and cannot see the displayed message in time. In response to receiving the text message in response to the transceiver, the speaker can output the voice message converted into the voice message, and the beneficial effect of the message can be timely learned even though the user at the other terminal is processing other things.

In addition, when the message is a voice message, it is still inaudible even when the user is out of the home, even if it reaches the counterpart terminal and is output by the counterpart terminal speaker. In the embodiment of the present invention, the voice message may be converted into text and displayed on the display of the opposite terminal or the voice message may be stored as an audio file in the counterpart terminal. Thus, when the user returns home, the content of the message can be seen or heard. So that the user can return home to see or hear the contents of the message to avoid the problem that the user is not at home cannot get the message content.

In addition, some of the message is very urgent, if the user is not at home, when the user came back to know the message has been too late to deal with. Since one embodiment of the present invention binds a terminal of the specific address to a specific mobile terminal and in response to the specific action being recognized being that a specific person is away from home, the transceiver sends the text message and/or voice message set by the specific person to a specific mobile terminal bound with the terminal at the specific address. In this way, it achieves the beneficial effect of timely receiving the message and processing it in time even if the user is not at home.

It is also possible to decide whether or not to forward the message to the bound partner's handset according to whether the user is at home. Since the embodiment of the present invention identifies a person or a specific person from the collected video and audio in response to receiving the text and/or the voice message from the transceiver, if no person or a specific person is recognized, the received text and/or voice message is forwarded to the user's mobile terminal bound to the terminal. In this way, the beneficial effect of the present invention is deciding where to leave the message according to whether the user is at home or not.

Since one embodiment of the present invention uses two end-to-end dedicated channels for communication between two terminals performing bidirectional live sharing and smart monitoring, the beneficial effects of better server resource saving can be achieved.

Since one embodiment of the present invention can communicate among multiple terminals that perform bi-directional live sharing and smart monitoring, the beneficial effects of live sharing between multiple members in the home as if they were in the same room are achieved.

In addition, since one embodiment of the present invention sends and receives information through a server in a plurality of terminals performing bi-directional live sharing and smart monitoring, compared with a method in which a dedicated channel is occupied between two or two terminals when the number of terminals performing bi-directional live sharing and smart monitoring is too large, the number of occupied dedicated channels can be reduced and resources can be released.

Since one embodiment of the present invention can simultaneously display videos of multiple terminals under the condition that multiple terminals that perform bidirectional live sharing and smart monitoring live share with each other, The beneficial effects of the present invention are that the users in communication can know the real-time situations of other users at a glance without any switching.

Since the terminal for bi-directional live sharing and smart monitoring provided by one embodiment of the present invention is selected in response to a video and/or corresponding identifier of a terminal from a specific one of a plurality of specific addresses, the display does not display the selected video from the terminal of the one specific address or does not output the audio. Therefore, the user can more freely select the object that the user wants to communicate currently when multiple live-sharing between two-way live sharing and smart monitoring terminals. The beneficial effect of the present invention is that the user not only can know the status of all shared members but also can communicate with only one shared member at a certain period of time according to the requirement, which is universal and personalized.

Since in response to a video and/or a corresponding identifier of a terminal from a specific one of the plurality of specific addresses is selected, the terminal for bidirectional live sharing and smart monitoring provided by one embodiment of the present invention display shows that the selected video from the terminal of the one specific address becomes an enlarged main screen. Thus enabling users to better communicate with other specific users for video communication and better understand the situation of specific users. The beneficial effect of the present invention is that the user not only can know the status of all the shared members but also can highlight the beneficial effects of the communication with a shared member at a certain time according to the needs, which is universal and personalized.

Since the terminal for bidirectional live sharing and smart monitoring provided in one embodiment of the present invention may target a specific address with the highest priority among a plurality of specific addresses with different priorities, the corresponding terminal video is displayed as the main screen. Can achieve more prominently to convey information to the user. Especially when the content that some people communicate is more important to the user than the others, the user's distraction caused by the content being communicated uniformly by all people is avoided.

The terminal for bidirectional live sharing and smart monitoring provided in one embodiment of the present invention may also set different priorities for different persons in a specific address. Thereby more smartly based on the identified specific person to automatically adjust the screen as the main screen. Alternatively, it is also possible to display only video of the terminal with the specific address with the highest priority for the specific person according to the identified specific person, thereby providing the user with a more personalized service. Especially for each user who are most concerned about are different circumstances, greatly improving the group's user experience. Avoids communication interference from less relevant users in the group.

The terminal for bidirectional live sharing and smart monitoring provided in an embodiment of the present invention may identify a person or a specific person based on one or more of character recognition, height recognition, and voice recognition. By comprehensively identifying people or people in many ways, the recognition is more accurate. Moreover, the present invention can also identify a person or a specific person based on a wireless signal, enhance the simplicity of identification, and further improve the accuracy of identification.

In addition, the present invention can also be combined with the depth sensor to identify audio and video information, in the identification of three-dimensional objects significantly improve the accuracy.

One embodiment of the present invention comprehensively identifies abnormal conditions by a variety of factors and improves the accuracy of identifying abnormal conditions, which including dramatic changes in video captured by the video capture unit, audio above a certain threshold captured by the audio capture unit, and dramatic changes in audio captured by the audio capture unit, predetermined events identified based on the video and audio captured separately by the video capture unit and the audio capture unit, etc.

Furthermore, since the present invention further includes a rotating device for rotating the video capture unit, the video capture unit can acquire the field information more completely and flexibly when acquiring the information.

Further, the rotating device can be rotated correspondingly according to the identified elements, so that the collected information is more targeted and the usefulness of the collected information is higher.

The terminal for bidirectional live sharing and smart monitoring according to one embodiment of the present invention further includes a light sensor, which adjusts the display brightness of the display according to the change of light, so as to make the user experience the visual experience of browsing information better.

It will be understood by those of ordinary skill in the art that although the following detailed description refers to the illustrated embodiments, the accompanying drawings, the present invention is not limited to these embodiments. Rather, the scope of the invention is to be broadly extended, and it is intended that the scope of the invention be defined solely by the appended claims.

BRIEF DESCRIPTION OF THE DRAWINGS

Other features, objects, and advantages of the invention will become more apparent by reading the detailed description of the non-limiting embodiments, taken with reference to the following drawings, in which:

FIG. 3 (b) shows a schematic diagram of communication between the terminal for bidirectional live sharing and smart monitoring according to another embodiment of the present invention and multiple terminals of a specific address;

The same or similar reference numbers in the drawings represent the same or similar components.

DETAILED DESCRIPTION

The present invention is further described in detail below with reference to the accompanying drawings.

Figure 1:
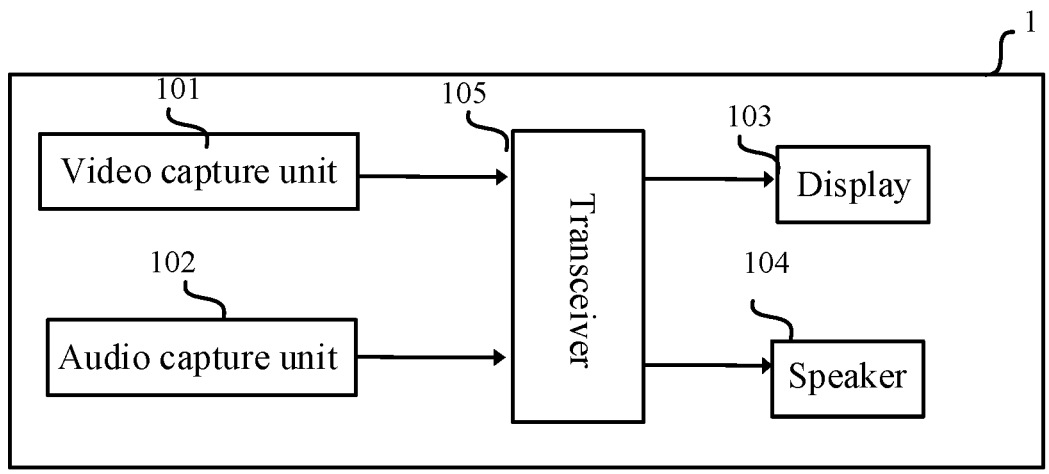
FIG. 1 shows a schematic block diagram of a terminal for bi-directional live sharing and smart monitoring according to one embodiment of the present invention.

FIG. 1 shows a schematic block diagram of a terminal 1 for bidirectional live sharing and smart monitoring of a live sharing terminal according to an embodiment of the present invention. The terminal 1 for bi-directional live sharing and smart monitoring without the call process according to an embodiment of the present invention includes: a video capture unit 101, an audio capture unit 102, a display 103, a speaker 104, and a transceiver 105. The transceiver 105 transmits the video and audio respectively captured by the video capture unit 101 and the audio capture unit 102 in real time to a specific address through a dedicated channel without having to establish a call with a specific address; and receive video and audio from the specific address in real time over the dedicated channel; and respectively output through the display 103 and the speaker 104. The transceiver 105 transmits notification information to the specific address in real time in response to identifying a person or a specific person, or a specific action, or an abnormal condition from video and audio respectively captured by the video capture unit 101 and the audio capture unit 102. Where a dedicated channel is established in advance and requires no further call setup each time the transceiver 105 needs to send video and audio in real time to a specific address or receive video and audio from a specific address for use in a trusted fixed place.

The abnormal situations are such as strangers visit, fire, crying, noisy, electrical accidents and so on. The specific address is, for example, an address of the terminal 1 for bidirectional live sharing and smart monitoring of another live sharing terminal in an opposite family member room, but is not limited to this address. The dedicated channel is, for example, a channel exclusively used for communication between the live sharing terminal 1 and the other live sharing terminal in the partner family member room during bi-directional live sharing and smart monitoring, which resource is always occupied. However, the dedicated channel may also be a set of dedicated channels formed by server trunking between the terminal for bidirectional live sharing and smart monitoring and the plurality of specific addresses. For example, the video and audio from the specific address refer to the video captured by the terminal 1 bi-directionally live-sharing and smartly monitored by the other live sharing terminal and the collected audio. Here, the video capture unit 101 is only used as an example. Any device having a video capturing function may be applicable to the present invention, for example, a camera, which is not limited herein. The audio capture unit 102 includes any device having an audio capture function, such as a recording unit. The display 103 includes any device having a display function. The speaker 104 is, for example, a loudspeaker on the external surface of the terminal 1 that carries out bi-directional live sharing and smart monitoring of live sharing terminals, but may also be other audio output devices. The transceiver 105, for example, an antenna, may also be other transceiving devices, such as a built-in wireless transceiver module. One of the trusted fixed places such as home, office and other places. The terminal performing bi-directional live sharing and smart monitoring establishes a dedicated channel for communication only in advance between trusted fixed places, and does not need to repeatedly establish a communication connection for each communication. The trusted fixed place may be pre-established according to the specific situation of the user or adaptively adjusted according to the habit of the user, which is not limited herein.

It should be noted that, after an unexpected situation such as a power outage or a network outage occurs in the terminal that performs bi-directional live sharing and smart monitoring, when the network returns to normal, the terminal that performs bi-directional live sharing and smart monitoring automatically reconnects with the terminal that originally maintained the communication to resume normal communication. No need to manually participate in the reconnection process of the terminal.

Figure 2:
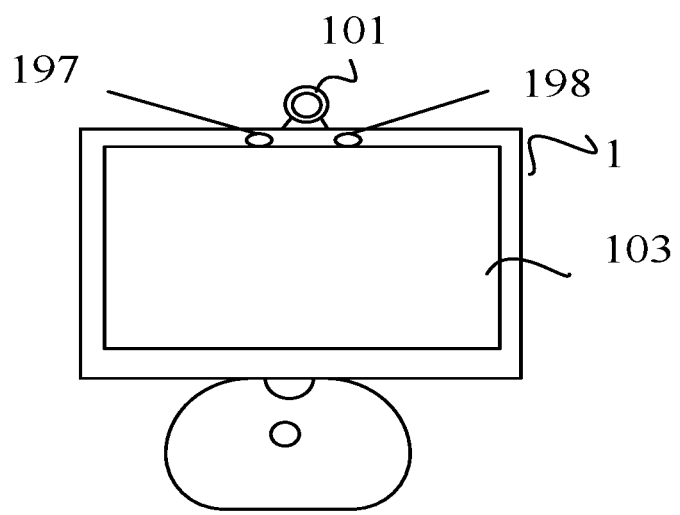
FIG. 2 shows an external front view of a terminal for bidirectional live sharing and smart monitoring according to one embodiment of the present invention.

In order to illustrate the terminal for bidirectional live sharing and smart monitoring provided by the present invention more clearly, reference is made to FIG. 2, which shows a terminal for bidirectional live sharing and smart monitoring according to an embodiment of the present invention Exterior front view. According to FIG. 2, in the terminal 1 performing bidirectional live sharing and smart monitoring, the video capture unit 101 is located at the upper end of the display 103. The terminal 1 performing bidirectional live sharing and smart monitoring further includes a depth sensor 197, a light sensor 198. Detailed explanation for depth sensor and light sensor is given below.

Herein, the terminal 1 performing bidirectional live sharing and smart monitoring includes, but is not limited to, any electronic product that can perform human-computer interaction with a user through a touchpad, a voice control device, a remote-control device or a keyboard, for example, a computer, tablet computer (PAD), network television (IPTV) and so on. Those skilled in the art should understand that other user equipment, if applicable to the present invention, should also be included in the protection scope of the present invention.

Figure 3:
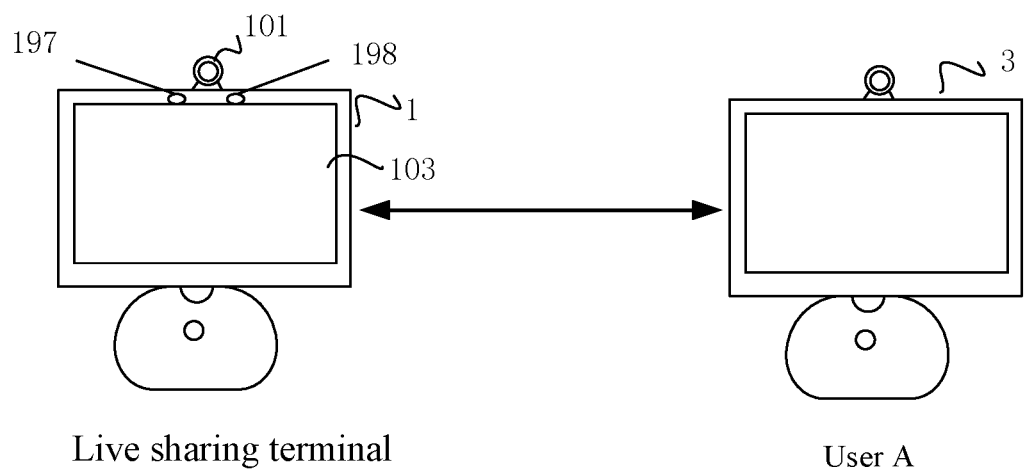
FIG. 3 (a) shows a schematic diagram of communication between a terminal for bi-directional live sharing and smart monitoring according to an embodiment of the present invention and a single terminal with a specific address.
Figure 3:
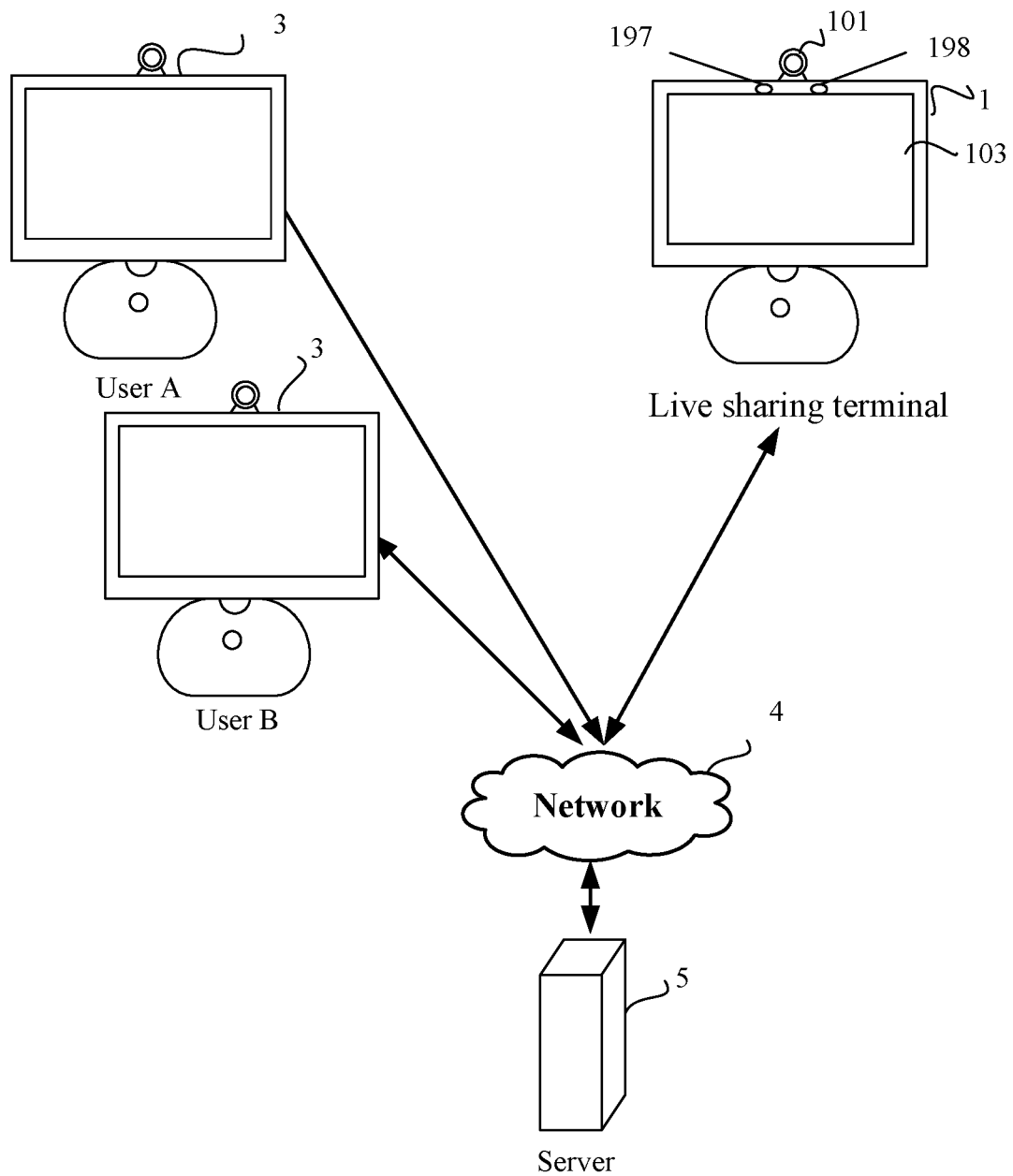

The specific address may be one or more specific addresses. The dedicated channel may be an end-to-end dedicated channel. Referring to FIG. 3 (a), there is shown an example of a process according to one embodiment of the present invention, the bi-directional live sharing and smart monitoring terminal 1 communicates with a single terminal 3 of a specific address, where a single terminal 3 with a specific address may be a terminal having the same function as the terminal performing bi-directional live sharing and smart monitoring. When the terminal 1 performing bidirectional live sharing and smart monitoring communicates with a single terminal 3 having a specific address, it is preferable to perform communication based on a Point-to-Point Protocol (Point-to-Point Protocol) to save communication resources.

Please refer to FIG. 3 (b), which shows a schematic diagram of a terminal performing bidirectional live sharing and smart monitoring according to another embodiment of the present invention and multiple terminals having a specific address. According to FIG. 3 (b), the terminal 1 performing bi-directional live sharing and smart monitoring and the plurality of terminals 3 having a specific address send and receive information through the network 4 and based on the server 5, that is, the dedicated channel is in this embodiment a set of dedicated channels formed by server transits between the terminal performing bi-directional live sharing and smart monitoring and the plurality of specific addresses.

When the specific address is a plurality of specific addresses, the display 103 may simultaneously display videos from the terminals of the multiple specific addresses, and may further display identifiers corresponding to the multiple videos, in the form of an identifier, for example, the shortcut icon corresponding to the video may be composed of simple graphics and words for representing its function or meaning, and may also have richer information. The terminal at a specific address may be the same terminal as the terminal for bidirectional live sharing and smart monitoring, or may be a terminal such as a tablet or a smart phone, which is not limited herein.

Optionally, the terminal for bi-directional live sharing and smart monitoring further includes a recorder (not shown), configured to start recording in response to identifying a person or a specific person from the collected video and audio, or a specific action, or an abnormal condition, and stop recording in response to a person or a specific person, or a specific action, or an abnormal condition disappears. The transceiver may also send the recorded content to the specific address in response to stopping recording.

Optionally, the terminal at the specific address is bound to a specific mobile terminal. In response to identifying a person or a specific person, or a specific action, or abnormal condition from the captured video and audio, the transceiver sends notification information to a specific mobile terminal that is bound to the terminal of the specific address and/or send the video and audio captured by the video capture unit and the audio capture unit in real time to the specific mobile terminal bound with the terminal of the specific address.

Optionally, in response to stopping recording, the transceiver sends the recorded content to the specific mobile terminal bound to the specific address.

The transceiver may send the recorded content only to the mobile terminal bound to a specific address, or may simultaneously send the recorded content to the terminal at the specific address and the mobile terminal bound to the specific address. In addition, when the transceiver receives the notification information and/or the recorded content sent by the terminal at a specific address, the transceiver may further identify whether a specific person exists in the video and audio respectively collected by the video capture unit 101 and the audio capture unit 102. In response to not identifying a specific person, i.e., the user is not in the room, forwarding notification information and/or recorded content sent from the terminal of the specific address to the number bound to the terminal (1) such as the user's mobile phone number. In this way, it is possible to flexibly decide whether to forward based on whether the user is at home or not, so that the user can always obtain notification information and/or recorded content in time and can handle the problem timely in some emergency situations.

Optionally, in response to identifying a person or a specific person, or a specific action, or an abnormal situation in the video and audio captured respectively by the video capture unit 101 and the audio capture unit 102, the notification information transmitted to the specific address in real-time by transceiver 105 includes at least one of:

information for requesting the terminal of the specific address enhances the display brightness of the video collected by the video capture unit 101 information for requesting the terminal of the specific address enhances the brightness of the identified person or specific person or the specific action or abnormal condition;

information for requesting the terminal of the specific address superimposes a specific text or picture on the display;

information for requesting the terminal of the specific address outputs a specific sound;

information for requesting the terminal of the specific address automatically records the video and the audio including identified person or specific person or the specific action or abnormal condition respectively collected by the video capture unit 101 and the audio capture unit 102 sent by the transceiver 105.

Specifically, the information sent by the transceiver 105 to the specific address may be that requiring the terminal of the specific address increases the brightness of the entire video captured by the video capture unit 101; or only increase the overall video of people or specific people, or specific actions, or abnormal display brightness. Of course, the information sent by the transceiver 105 to the specific address may also be: requesting the terminal of the specific address superimposes a specific text or picture on the display. For example, when the terminal performing bidirectional live sharing and smart monitoring sends audio and video related to a fire to a specific address, the terminal that performs bidirectional live sharing and smart monitoring automatically acquires or calibrates, according to a self-learning manner, time for sending audio and video or the time for the event. When displaying the real-time video of the terminal 1 performing bi-directional live sharing and smart monitoring, the terminal requiring the specific address may superimpose and display the text of the important historical information such as the time of the fire on the video such as the lower left corner or the right or other reasonable locations. In addition, the information sent by the transceiver 105 to the specific address may further be that the terminal that requests the specific address outputs a specific sound. The specific sound may be a sound input by a user received by the terminal 1 performing bi-directional live sharing and smart monitoring or a sound file automatically acquired from a memory (not shown in FIG. 1) based on a self-learning manner. In addition, the terminal at the specific address is required to automatically record video including the person or the specific person or the specific action or the abnormality information respectively collected by the video capture unit 101 and the audio capture unit 102 and sent by the transceiver 105 and audio information. It is possible to effectively save and play back the important situation that occurs at the time of the terminal performing bi-directional live sharing and smart monitoring.

Optionally, the transceiver 105 receives video and audio from the specific address in real time, also receives notification information from the specific address regarding a person or a specific person, or a specific action, or an abnormal situation identified by the terminal at the specific address After receiving the notification information, the terminal 1 performing bi-directional live sharing and smart monitoring performs a corresponding operation according to the notification information. Optionally, the terminal 1 performing bi-directional live sharing and smart monitoring performs the operation of at least one of the following in response to the received notification information:

enhance the brightness of displayed video displayed by display 103;

enhance the brightness of a person or a specific person or a specific action or an abnormal condition displayed by display 103 and identified by the terminal at the specific address;

superimposing a specific text or picture on the display 103;

outputs a specific sound by speaker 104;

automatically records the received video and the audio including identified person or specific person or the specific action or abnormal condition.

Optionally, the terminal that performs bi-directional live sharing and smart monitoring sends a message to the specific address in response to the specific action being recognized when a person leaves a certain distance range or a certain place.

Optionally, the message set by the specific person is a text message and/or a voice message, wherein the text message is input by the specific person on an interface of the display, and the voice message is sent by the specific person through the audio capture unit 102 recorded. For example, when a terminal that performs bi-directional live sharing and smart monitoring recognizes that a person is leaving home, by receiving text messages and/or voice memo previously input or preset by a person who has left the home, and/or based on a self-learning manner the memory automatically gets the corresponding text message and/or voice message and sends it to a specific address.

Optionally, a text message is displayed on the display 103 in response to receiving the text message by the transceiver 105, and/or the speaker 104 is caused to output a voice converted into a text message at a predetermined human voice.

Optionally, in response to receipt of the voice memo by the transceiver 105, the text to which the voice memo is converted is displayed on the display 103. The voice message is output by the speaker 104, and/or the voice message is saved as an audio file in the terminal 1 for later listening by the user Optionally, the terminal at the specific address is bound to a specific mobile terminal. In response to a specific person being recognized as leaving a home, the transceiver 105 transmits the text message and/or the voice memo set by the specific person to a specific mobile terminal bound to the terminal of the specific address.

Optionally, the terminal 1 is bound to the user's mobile terminal and receives text and/or voice messages in response to the transceiver 105. A person or a specific person is recognized from the video and audio respectively captured by the video capture unit 101 and the audio capture unit 102. In response to no video or audio captured from the video capture unit 101 or the audio capture unit 102, respectively, Person, and forwards the received text and/or voice message to the user's mobile terminal bound to the terminal 1.

Optionally, in response to a specific person being identified as leaving a home, the transceiver 105 sends the message set by the specific person to the specific address. In this way, when family member A leaves home and family member B leaves home, the message sent to a specific address is not the same.

Through the message function, other family members can still see/hear his message even if the user is away from home and therefore cannot be input the message by the video capture unit. At the same time, it also solves the inconvenience, for example, leaving message to the family member when the user leaves home, but the family member is sleeping or absent.

According to the above, the display 103 of the terminal that performs bidirectional live sharing and smart monitoring may not only display one or more videos, but also display an identifier corresponding to the video. The form of logo is not limited here. For example, a shortcut icon corresponding to a video, which may consist of simple graphics and words for representing its function or meaning, and may also have richer information. Optionally, a video and/or corresponding identification in response to a terminal from a specific one of the plurality of specific addresses is selected. The display 103 does not display the video from the terminal of the one specific address and/or the speaker 104 does not output the audio from the terminal of the one specific address. Of course, you can also reverse the choice. That is, the video of the unselected video and/or the terminal of the specific address corresponding to the corresponding identifier is not displayed and/or the audio is not output. Although video and/or audio is not output, the display 103 of the terminal that performs bidirectional live sharing and smart monitoring does not display the video corresponding to the specific address and/or the speaker 104 thereof does not output the sound corresponding to the specific address. However, it should be noted that the terminal that performs bi-directional live sharing and smart monitoring stays in communication with the terminal corresponding to a specific address without disconnecting.

Typically, for example, the user A performing bi-directional live sharing and smart monitoring communicates with the terminal users corresponding to the two specific addresses B and C, and the display of the terminal performing bi-directional live sharing and smart monitoring simultaneously displays When the user A performs a selection operation such as a click, a double tap or the like on the video and/or the corresponding identifier corresponding to B, the video and the corresponding identifier corresponding to B and C are not displayed on the display of the terminal performing bidirectional live sharing and smart monitoring The corresponding video only displays the video corresponding to C, in this case, the terminal that still performs bidirectional live sharing and smart monitoring still communicates with the terminal corresponding to address B, and only or not the audio corresponding to address B is output or not output.

Optionally, in response to the video and/or the corresponding identification of the terminal from one of the plurality of specific addresses being selected, the display 103 may display that the video of the terminal from the one specific address becomes an enlarged main screen. Similarly, in the above example, the communication between the user A and the two end users corresponding to the two specific addresses B and C of the terminal performing bidirectional live sharing and smart monitoring is taken as an example. When the terminal of the terminal performing bidirectional live sharing and smart monitoring displays B And C, and the video images corresponding to B and C displayed on the display are the same size. When the user A performs a selection operation such as a click and a double click on the video and/or the corresponding identifier corresponding to B, the display 103 upgrade the video corresponding to address B to the main screen to highlight the video corresponding to C In a preferred embodiment, the plurality of specific addresses has different priorities. Sort by priority. The display 103 displays the video of the terminal of the specific address with the highest priority as the main screen. The different priorities may be preset by the user and stored in a memory (not shown). Or may be set and adjusted by the terminal for bidirectional live sharing and smart monitoring based on a self-learning manner. This is not a limitation. More preferably, the priority is different for a plurality of specific ones of the plurality of specific addresses. That is, there is an order of priority for different specific persons for the same specific address. The display 103 identifies a specific person from a specific address terminal in response to video and audio captured respectively from the video capture unit 101 and the audio capture unit 102. The video from the terminal for the specific address with the highest priority for that specific person is displayed as the main screen. More preferably, a specific person is identified in response to video and audio respectively acquired from the video capture unit 101 and the audio capture unit 102. The display 103 displays a video from the terminal of the specific address with the highest priority for that specific person. Video from terminals at other specific addresses is automatically hidden or turned off automatically.

The identification of a person or a specific person by the terminal 1 performing bidirectional live sharing and smart monitoring is performed based on one or more of character recognition, height recognition, and voice recognition. Through the combination of multiple recognition methods, the recognition accuracy is increased.

In the case of recognition of people, because the pattern of the face is very similar, the clear majority of people are also within the specific height, the frequency of human voices is also within a specific range. Therefore, for example, when a certain area in the captured image is similar to the stored face pattern; and the distance between the face sensed by the position sensor and/or the depth sensor (as shown in FIG. 2) and the terminal 1 performing bidirectional live sharing and smart monitoring determines that the height of the face is within a specific range; and/or the audio captured by the audio capture unit 102 is also within a specific range, then it can identify people's existence. That is, people are identified in conjunction with the video and audio captured by the video capture unit 101, the audio capture unit 102, and the depth or height sensed by the depth sensor 197, respectively. The depth sensor 197 can be located at the left of the upper center of the display 103, can also be in other more reasonable position. By sensing the distance or/and distance of a person or object from the terminal 1 that is bi-directionally live-sharing and smartly monitored. To more accurately identify people, specific people, and/or specific actions. When an action takes place on a person or an object, the magnitude of the change in the captured image will be different for the same range of motion due to the difference in distance from the terminal 1 for bidirectional live sharing and smart monitoring. Therefore, combined with the depth sensor, the movement can be more accurately identified, to improve the recognition accuracy.

In the case of identifying a specific person, the pattern and/or height and/or sound frequency of a specific person's face may be stored in advance in a memory (not shown). When a certain area in the captured image matches the stored pattern of the specific face; and/or the distance between the specific face detected by the position sensor and/or the depth sensor and the terminal 1 that performs bi-directional live sharing and smart monitoring determines that the height matches the stored height; and/or the matching of the audio collected by the audio capture unit 102 and the stored frequency of changing the specific person's voice. It can identify the existence of a specific person.

Identifying people or the existence of a specific person can also be self-learning. For example, if a pattern in a captured image always appears at a certain frequency with the captured sound, a prompt can be displayed on the display. That is, a person has been identified. The user of the terminal 1 for bi-directional live sharing and smart monitoring is invited to judge and name the identified person. If the user of the terminal 1 for bi-directional live sharing and smart monitoring finds out that it is a recognition error, it is fed back on the display interface. Upon receipt of such feedback, no human or specific person is deemed present at the same time as this pattern in the next shot of the image appears coincident with such frequency of captured sound. In the self-learning mode, the pattern and/or height and/or sound frequency of the face of a specific person may also not be stored in advance in storage.

Optionally, the identity or specific person is indicated based on the wireless signal carried by the portable phone. For example, the terminal 1 performing bi-directional live sharing and smart monitoring has a Bluetooth device, and the user's cell phone also has a Bluetooth wireless unit. When the terminal 1 performing bi-directional live sharing and smart monitoring recognizes that a specific identity Bluetooth wireless unit is within a certain distance, it is considered that a specific person has been identified.

The identification of a specific action may also be based on the video and audio captured by the video capture unit 101 and the audio capture unit 102 and the depth sensed by the depth sensor 197, respectively. Optionally, the specific action is to create a model for a specific action in advance and search the video and audio information respectively captured by the video capture unit 101 and the audio capture unit 102 for the matching identification with the established model. Optionally, the model is a standardized model that is input in advance, that is, artificially set in advance and a model is established according to a set action. For example, for an action like watching TV, create a model that identifies a person sitting on a couch, looks down the person's gaze, has an object, recognizes that the object is a television, and the person stays on television at least 10 seconds. If a person is detected from the image captured by the video capture unit 101 and then the person is detected to be sitting on the couch (the recognition of the sofa resembles face recognition can also be performed by pattern matching or the image of the person sitting on the sofa as a whole as an object for pattern matching recognition), and then detect the direction of the person's gaze, and then detect whether the object in the gaze direction of the person is a television (for example, the television is modeled as an object), and if so counts for 10 seconds.

In an embodiment, the terminal 1 performing bi-directional live sharing and smart monitoring may also automatically create an action model by means of self-learning such as machine learning. For example, the terminal 1 extracts the action feature from the video and audio captured by the video capture unit 101, the audio capture unit 102, and establishes the action model based on the extracted feature. For example, one person found in the video and audio captured by the video capture unit 101 and the audio capture unit 102 finds himself sitting on the couch, having a television in the direction of the person's eyes and watching the event of the person staying on the television If the frequency exceeds the threshold for more than 10 seconds, this is considered as a model of a specific action. In this case, the motion model may not be stored in the database in advance, but a model of action is extracted from the video and audio captured from the video capture unit 101, the audio capture unit 102 in a self-learned manner.

Optionally, the abnormal condition is identified by identifying one or more of:

dramatic changes in the video captured by the video capture unit 101;

audio captured by the audio capture unit 102 above a certain threshold;

a dramatic change in audio captured by the audio capture unit 102;

a predetermined event identified based on the video and audio respectively captured by the video capture unit 101 and the audio capture unit 102, wherein a model of the predetermined event has been established in advance and a predetermined event is identified by searching for an event matched with an established model from video and audio respectively acquired based on the video capture unit 101 and the audio capture unit 102.

To save data resources, the transceiver 105 transmits only the video and audio change values in the case that the video and audio captured respectively by the video capture unit 101 and the audio capture unit 102 are changed. Accordingly, the transceiver 105 receives the video and audio variation values from the specific address, superimposes the video, and audio variation values on the video displayed by the display 103 and the audio output by the speaker 104.

Figure 4:
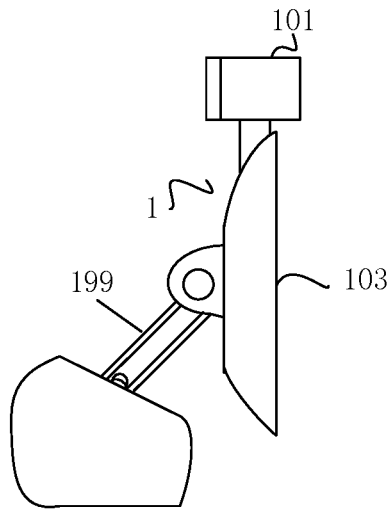
FIG. 4 shows an external left side view of a terminal for bi-directional live sharing and smart monitoring according to one embodiment of the present invention.

Preferably, in order to more flexibly collect audio and video information, the terminal 1 performing bi-directional live sharing and smart monitoring further includes a rotating device 199 for rotating the video capture unit 101. To illustrate the rotating device 199 more clearly, please refer to FIG. 4. FIG. 4 shows an external left side view of a terminal for bidirectional live sharing and smart monitoring according to one embodiment of the present invention. The rotating device 199 can be turned up, down, left and right More specifically, the pivoting device 199 rotates up, down, left and right toward the recognized element.

In one embodiment, in response to identifying one of the following elements in the video and audio respectively captured from the video capture unit 101 and the audio capture unit 102, the rotating device 199 rotates the video capture unit 101 in the direction of the recognized element:

person or specific person;
specific action;
abnormal condition.

Figure 5:
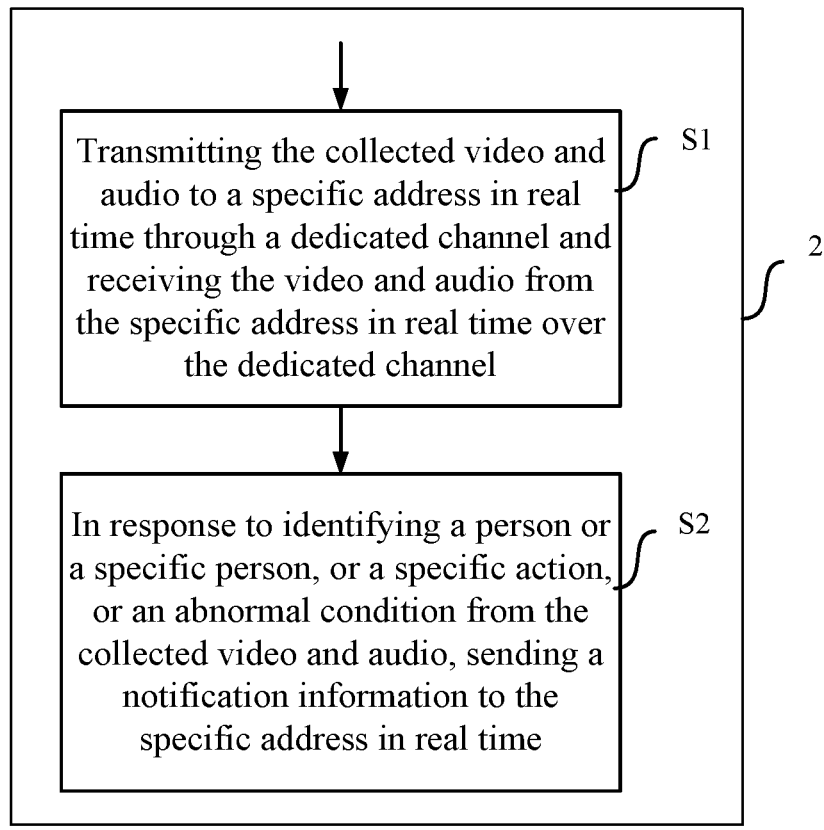
FIG. 5 shows a flowchart of a method for bidirectional live sharing and smart monitoring according to yet another embodiment of the present invention.

In order to provide users with a better visual experience, please refer to FIG. 2. The terminal 1 performing bi-directional live sharing and smart monitoring further includes a light sensor 198 for sensing ambient light changes around the terminal 1, wherein the display brightness of the display 103 is adjusted according to the sensed change of the light. For example, when the sensed sensing is bi-directional live sharing and smart monitoring of the terminal 1 ambient light is strong, the display with relatively strong brightness may make the user more comfortable; and the sensed the ambient light of the terminal 1 for bi-directional live sharing and smart monitoring is weak, it may be more comfortable for the user to adjust it with relatively weak brightness FIG. 5 shows a flowchart of a method for bi-directional live sharing and smart monitoring according to yet another embodiment of the present invention. According to FIG. 5, the method 2 for bidirectional live sharing and smart monitoring includes:

Step S1: transmitting the collected video and audio to a specific address in real time through a dedicated channel and receiving the video and audio from the specific address in real time over the dedicated channel;

Step S2: in response to identifying a person or a specific person, or a specific action, or an abnormal condition from the collected video and audio, sending a notification information to the specific address in real time.

Optionally, in response to identifying a person or a specific person, or a specific action, or an abnormal condition from the captured video and audio, recording begins, and in response to a person or a specific person, or a specific action, or an anomaly disappears, stop recording, and in response to stopping recording, send the recorded content to the specific address.

Optionally, the terminal of the specific address is bound to a specific mobile terminal, and the method further includes: in response to identifying a person or a specific person, or a specific action, or an abnormal condition from the captured video and audio, sending notification information to a specific mobile terminal bound to the terminal of the specific address, and/or sending the video and audio captured by the video capture unit and the audio capture unit in real time to a specific mobile terminal bound to the terminal of the specific address.

Optionally, in response to stopping recording, the recorded content is transmitted to the specific mobile terminal bound with the specific address.

Optionally, the notification information includes at least one of the following:

information for requesting the terminal of the specific address enhances the display brightness of the collected video;

information for requesting the terminal of the specific address enhances the brightness of the identified person or specific person or the specific action or abnormal condition; information for requesting the terminal of the specific address superimposes a specific text or picture on the display;

information for requesting the terminal of the specific address outputs a specific sound; information for requesting the terminal of the specific address automatically records the video and the audio including identified person or specific person or the specific action or abnormal condition sent to the specific address.

Optionally, the method for bi-directional live sharing and smart monitoring is further comprise of: receiving notification information from the specific address regarding the person or specific person identified by the terminal at the specific address, or a specific action, or an abnormal condition.

Further, the method for bidirectional live sharing and smart monitoring may further include: in response to receiving the notification information, at least one of the following is performed:

enhance the brightness of displayed video;

enhance the brightness of a person or a specific person or a specific action or an abnormal condition identified by the terminal at the specific address;

superimposing a specific text or picture on the display;

outputs a specific sound;

automatically records the received video and the audio including identified person or specific person or the specific action or abnormal condition.

Optionally, a message is sent to the specific address in response to the specific movement being recognized as a departure from home.

Optionally, in response to the received notification information being a message, a message is displayed.

Optionally, in response to the specific action being recognized that a specific person leaves home, a message set by the specific person is sent to the specific address.

Optionally, the message set by the specific person is a text message and/or a voice message, wherein the text message is input by the specific person on the interface, and the voice message is recorded by the specific person through the audio capture unit.

Optionally, in response to the text message being received, the text message is displayed and/or is output by converting the text message into human voice, Optionally, in response to receiving the voice memo, displaying the text into which the voice memo is converted, and/or outputting the voice memo, and/or saving the voice memo as an audio file for later listening by the user.

Optionally, the terminal of the specific address is bound to a specific mobile terminal, and in response to the specific action being identified being a specific person leaving home, sending the text message and/or the voice message set by the specific person to the terminal of the specific address bound to specific mobile terminal.

The flowcharts and block diagrams in the figures illustrate the architecture, functionality, and operation of possible implementations of systems, methods, and computer program products in accordance with various embodiments of the present invention. In this regard, each block of the flowchart illustrations or block diagrams, which may represent a module, a section of a program, or a portion of a code that includes one or more portions of a program for implementing specified logic functions Executable instructions. It should also be noted that in some alternative implementations, the functions noted in the blocks may occur out of the order noted in the figures. For example, two consecutive blocks may in fact be executed substantially in parallel, and sometimes they may be executed in the reverse order, depending on the function involved. It is also to be noted that each block of the block diagrams and/or flowchart illustrations, and combinations of blocks in the block diagrams' and/or flowchart illustration, can be implemented by special purpose hardware-based systems that perform the specified functions or operations, or may be implemented using a combination of dedicated hardware and computer instructions.

It will be apparent to those skilled in the art that the invention is not limited to the details of the foregoing exemplary embodiments, but that the present invention may be embodied in other specific forms without departing from the spirit or essential characteristics of the invention. Thus, the present examples are to be considered in all respects as illustrative and not restrictive, the scope of the invention being indicated by the appended claims rather than by the foregoing description, and thus is intended to be included in the claims, all changes which come within the meaning and range of equivalency of the appended claims are intended to be embraced therein. Any reference signs in the claims should not be construed as limiting the claim involved.

What is claimed is:

1. A terminal for bi-directional live sharing and smart monitoring, comprising: a video capture unit, an audio capture unit, a display, a speaker and a transceiver;
    wherein the transceiver is configured to transmit a video and an audio respectively captured by the video capture unit and the audio capture unit in real time to a specific address via a dedicated channel and receive a video and an audio from the specific address in real time through the dedicated channel, then output respectively through the display and the speaker;
    the transceiver is configured to: in response to receiving the video and the audio from the specific address, identify whether a person or a specific person, a specific action, or an abnormal condition exists in the video and the audio respectively captured by the video capture unit and the audio capture unit; and in response to identifying the person or the specific person, the specific action, or the abnormal condition from the video and audio respectively captured by the video capture unit and the audio capture unit, send a first notification information to the specific address in real time;
    wherein the dedicated channel is established in advance, and at each time when the transceiver sends the video and audio in real time to the specific address or receives the video and audio from the specific address, there is no need to re-establish a call, and the terminal is used for a trusted fixed place: and
    wherein the transceiver is further configured to receive, from the specific address, a second notification information indicating that the person, the specific person, the specific action or the abnormal condition is identified by a terminal at the specific address.

2. The terminal according to claim 1, further comprising a recorder configured to start recording the video and audio in response to identifying the person or the specific person, the specific action, or the abnormal condition from the captured video and audio, and stop recording in response to the person or the specific person, or the specific action, or the abnormal condition disappears,
    wherein the transceiver is configured to transmit a recorded content to the specific address when the recording is stopped.

3. The terminal according to claim 1, wherein the terminal at the specific address is bound with a specific mobile terminal, wherein
    the transceiver is further configured to: in response to identifying the person or the specific person, or the specific action, or the abnormal condition from the captured video and audio, send the first notification information to the specific mobile terminal bound with the terminal at the specific address, and/or send the video and audio captured by the video capture unit and the audio capture unit in real time to the specific mobile terminal bound with the terminal at the specific address.

4. The terminal according to claim 1, wherein the first notification information includes at least one of the following:
    information for requesting the terminal at the specific address enhances the display brightness of the video collected by the video capture unit;
    information for requesting the terminal at the specific address enhances the brightness of the identified person or specific person or the specific action or abnormal condition;
    information for requesting the terminal at the specific address superimposes a specific text or picture on the display;
    information for requesting the terminal at the specific address outputs a specific sound; and
    information for requesting the terminal at the specific address automatically records the video and the audio including the identified person or specific person or the specific action or abnormal condition respectively collected by the video capture unit and the audio capture unit sent by the transceiver.

5. The terminal according to claim 1, wherein in response to receiving the second notification information, the terminal is configured to perform at least one of the following:
enhancing the brightness of displayed video received by the display;
enhancing the brightness of the person or the specific person or the specific action or the abnormal condition identified by the terminal at the specific address;
superimposing a specific text or picture on the display;
the speaker outputting a specific sound; and
automatically recording the video and the audio including the identified person or specific person or the specific action or abnormal condition received by the transceiver in real-time.

6. The terminal of claim 1, wherein the transceiver is configured to sends a message to the specific address in response to the specific action being recognized as a departure from home.

7. The terminal according to claim 6, wherein the terminal at the specific address is bound with a specific mobile terminal, and the transceiver is configured to: in response to the specific action identified being that the specific person leaves home, send a text message and/or a voice message set by the specific person to the specific mobile terminal bound with the terminal at the specific address.

8. The terminal according to claim 1, wherein the terminal is bound with a user's mobile terminal, and the transceiver is configured to: in response to the transceiver receiving a text and/or voice message, identify whether the person or the specific person exists in the video and audio respectively collected from the video capture unit and the audio capture unit; in response to not identifying the person or the specific person from video or audio captured by the video capture unit or the audio capture unit, forwarding the received text and/or voice message to the user's mobile terminal bound with the terminal.

9. The terminal according to claim 1, wherein the specific address is a plurality of specific addresses.

10. The terminal according to claim 9, wherein the dedicated channel is a set of dedicated channels formed by server transfer between the terminal and the plurality of specific addresses.

11. The terminal of claim 1, wherein the abnormal conditions are identified by identifying one or more of:
audio captured by the audio capture unit above a certain threshold; and
a predetermined event identified based on the video and audio respectively captured by the video capture unit and the audio capture unit, wherein a model of the predetermined event has been established in advance and a predetermined event is identified by searching for an event matched with an established model from video and audio respectively acquired based on the video capture unit and the audio capture unit.

12. A method for bi-directional live sharing and smart monitoring comprising:
transmitting a collected video and audio to a specific address in real time through a dedicated channel and receiving a video and audio from the specific address in real time over the dedicated channel;
in response to receiving the video and the audio from the specific address, identify whether a person or a specific person, a specific action, or an abnormal condition exists in the collected video and audio video; and
in response to identifying the person or the specific person, or the specific action, or the abnormal condition from the collected video and audio, sending a first notification information to the specific address in real time, wherein
the dedicated channel is established in advance, and at each time when sending the video and audio in real time to the specific address or receiving the video and audio from the specific address, there is no need to re-establish a call; and
the method further comprises: receiving from the specific address, a second notification information indicating that the person, the specific person, the specific action or the abnormal condition is identified by a terminal at the specific address.

13. The method of claim 12, further comprising:
starting recording the video and audio in response to identifying the person or the specific person, or the specific action, or the abnormal condition from the collected video and audio; stopping the recording in response to the person or the specific person, or the specific action, or the abnormal condition disappearing; and sending a recorded content to the specific address in response to stopping the recording.

14. The method according to claim 12, wherein the terminal at the specific address is bound with a specific mobile terminal, and the method further comprises:
in response to identifying the person or the specific person, or the specific action, or the abnormal condition from the collected video and audio, sending the first notification information to the specific mobile terminal bound with the terminal at the specific address, and/or sending the collected video and audio in real time to the specific mobile terminal bound with the terminal at the specific address.

15. The method of claim 12, wherein the first notification information includes at least one of:
information for requesting the terminal at the specific address enhances the display brightness of the collected video;
information for requesting the terminal at the specific address enhances the brightness of the identified person or specific person or the specific action or abnormal condition;
information for requesting the terminal at the specific address superimposes a specific text or picture on the display;
information for requesting the terminal at the specific address outputs a specific sound; and
information for requesting the terminal at the specific address automatically records the video and the audio including the identified person or specific person or the specific action or abnormal condition sent to the specific address.

16. The method of claim 12, further comprising: in response to receiving the second notification information, performing at least one of the following:
enhancing the brightness of displayed video;
enhancing the brightness of the person or the specific person or the specific action or the abnormal condition identified by the terminal at the specific address;
superimposing a specific text or picture on the display;
outputting a specific sound; and
automatically recording the received video and audio including the identified person or specific person or the specific action or abnormal condition.

17. The method of claim 12, further comprising transmitting a message set by the specific person to the specific address in response to the specific action identified being that the specific person leaves the home.

18. The method according to claim 17, wherein the message set by the specific person is a text message and/or a voice message, wherein the text message is input by the specific person on an interface of the display, the voice message is recorded by the specific person through an audio capture unit.

* * * * *